Aug. 24, 1926.
H. E. BAILEY
1,597,566
PIE HOLDER
Filed July 7, 1923
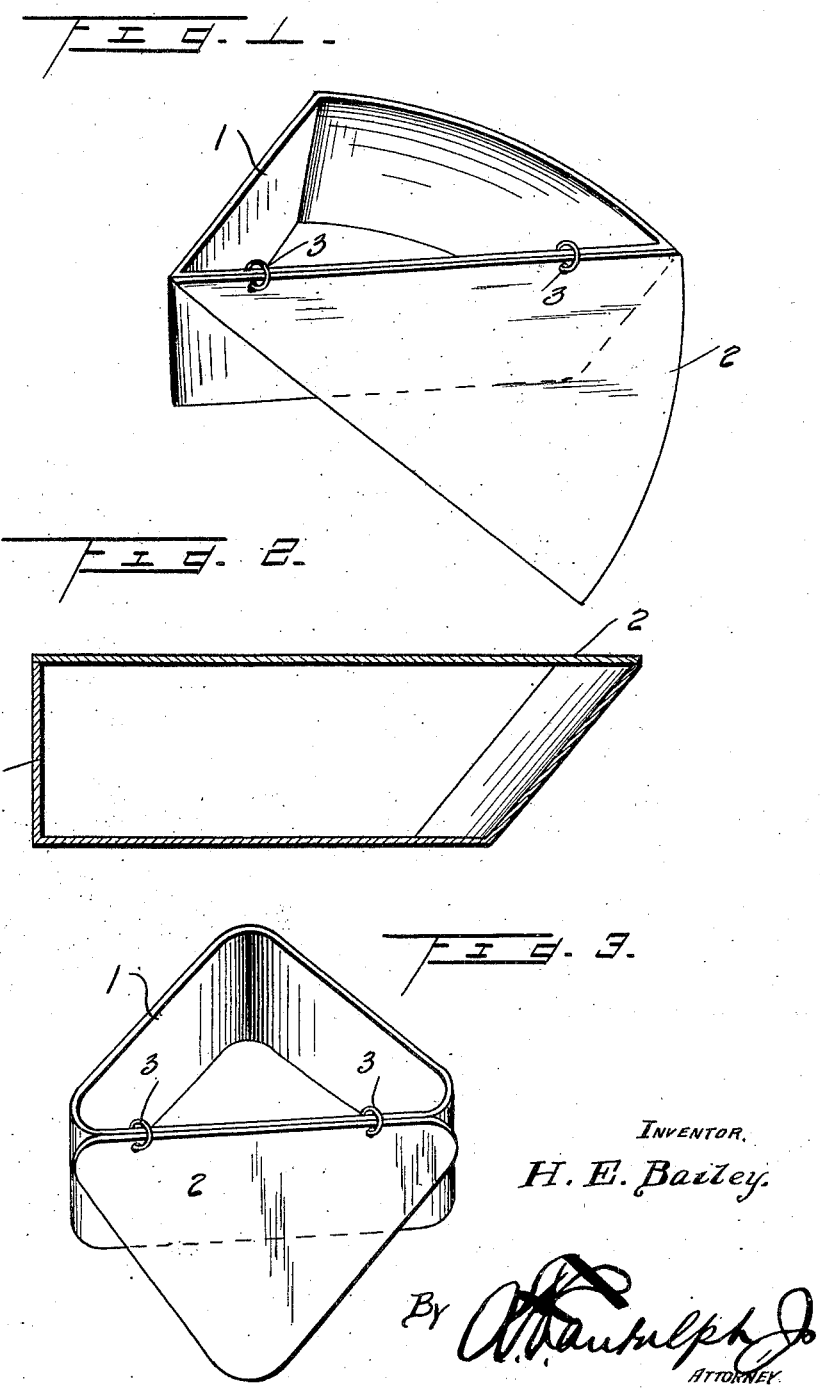
INVENTOR.
H. E. Bailey.
By
ATTORNEY.

Patented Aug. 24, 1926.

1,597,566

UNITED STATES PATENT OFFICE.

HARRIET E. BAILEY, OF TEHACHAPI, CALIFORNIA.

PIE HOLDER.

Application filed July 7, 1923. Serial No. 650,117.

The object of this invention is the provision of a holder for receiving a slice or cut of pie, whereby the same may be safely and conveniently carried in a lunch box without the liability of being crushed by other articles coming in contact therewith, said means consisting of a holder approximating in form the outline of an ordinary slice of pie of usual size, said holder being preferably constructed of sheet metal and in a manner to admit of the slice or cut of pie being easily placed therein and readily removed therefrom.

A further object of the invention is the provision of a holder of the character aforesaid which is simple and light in structure and capable of being readily cleaned and which, when placed in a lunch box, will occupy a minimum amount of space and afford protection to the slice of pie contained therein and prevent other articles from crushing or otherwise coming in contact with the pie to the detriment of the latter and the disadvantage of the articles coming in contact therewith.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a pie holder embodying the invention, the cover being open, Figure 2 is a longitudinal section of the holder, the cover being closed, and Figure 3 is a perspective view of a modification.

Corresponding and like parts are referred to in the following description and designated in the several views of the drawings by like reference characters.

The holder comprises a pan or tray 1 and a cover 2, the latter being hinged to the upper edge of a side of the pan or tray. The holder is shallow and conforms in outline to a slice or cut of pie of standard or usual size. The outer end of the pan or tray may be formed on the arc of a circle, as indicated most clearly in Figure 1, and flares to correspond with the outer end of a slice or cut of pie. The angles formed between adjacent sides of the pan or tray may be pointed, as indicated most clearly in Figure 1, however this is not essential as they may be rounded, as indicated most clearly in Figure 3. This figure also shows the outer end of the pan or tray straight instead of curved, as indicated in Figure 1.

The holder may be constructed of any suitable material and in the preferable construction, the pan or tray 1 will be pressed or stamped into the required shape of sheet metal, such as aluminum. The cover 2 comprising a flat plate and is adapted to extend over and rest upon the upper edges of the sides of the pan or tray and is hinged at one edge to the upper edge of a side thereof. The hinge connection between the cover and pan may be of any construction and, as shown, rings 3 of wire are looped into openings formed in corresponding edge portions of the cover and a side of the pan. By having an end of the pan or tray flared, it conforms to the outer edge of the slice or cut of pie and moreover facilitates the placing of the pie in the holder and the removing of the pie therefrom.

What is claimed is:

A pie holder comprising a pan of sector formation in plan, the straight side walls of the pan being vertical and the arcuate side wall thereof being inwardly and downwardly inclined, a flat cover plate of sector formation resting upon the upper edges of said walls, and elements hinging a straight edge of the cover plate to one of said straight side walls.

In testimony whereof I affix my signature.

HARRIET E. BAILEY.